United States Patent
Berreth et al.

(10) Patent No.: US 9,672,052 B1
(45) Date of Patent: Jun. 6, 2017

(54) SECURE INTER-PROCESS COMMUNICATION

(75) Inventors: Frank Berreth, Irvine, CA (US); Eric A. Moon, Seattle, WA (US); Robert R. Henry, Seattle, WA (US)

(73) Assignee: Google Inc., Mountain View, CA (US)

( * ) Notice: Subject to any disclaimer, the term of this patent is extended or adjusted under 35 U.S.C. 154(b) by 1139 days.

(21) Appl. No.: 13/398,715

(22) Filed: Feb. 16, 2012

(51) Int. Cl.
| | |
|---|---|
| *G06F 9/455* | (2006.01) |
| *G06F 9/46* | (2006.01) |
| *G06F 9/50* | (2006.01) |
| *G06F 9/54* | (2006.01) |
| *G06F 21/53* | (2013.01) |

(52) U.S. Cl.
CPC .............. *G06F 9/455* (2013.01); *G06F 9/544* (2013.01); *G06F 9/45533* (2013.01); *G06F 9/45558* (2013.01); *G06F 9/46* (2013.01); *G06F 9/50* (2013.01); *G06F 9/54* (2013.01); *G06F 21/53* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 5,463,768 A | 10/1995 | Cudihy et al. | |
| 5,778,444 A | 7/1998 | Langan et al. | |
| 6,178,482 B1 | 1/2001 | Sollars | |
| 6,505,211 B1 | 1/2003 | Dessloch et al. | |
| 6,598,179 B1 | 7/2003 | Chirashnya et al. | |
| 6,898,697 B1 | 5/2005 | Gao et al. | |
| 7,062,718 B2 | 6/2006 | Kodosky et al. | |
| 7,117,243 B2 | 10/2006 | Peart | |
| 7,478,388 B1 | 1/2009 | Chen et al. | |
| 7,529,836 B1 | 5/2009 | Bolen et al. | |
| 7,596,620 B1 | 9/2009 | Colton et al. | |
| 7,650,331 B1 | 1/2010 | Dean et al. | |
| 7,653,833 B1 | 1/2010 | Miller et al. | |
| 7,761,573 B2 | 7/2010 | Travostino et al. | |

(Continued)

OTHER PUBLICATIONS

Mohebbi et al. ("ZIVM: a Zero-Copy inter-VM communication mechanism for cloud computing", computer and information science vol. 4, Nov. 2011, pp. 18-27).*

(Continued)

*Primary Examiner* — Meng An
*Assistant Examiner* — Caroline H Arcos
(74) *Attorney, Agent, or Firm* — Fish & Richardson P.C.

(57) ABSTRACT

Among other disclosed subject matter, a system includes a secure execution domain configured to execute trusted processes. The system also includes a hardware virtualization component in the secure execution domain and configured to implement a virtual machine. The virtual machine is a hardware virtualization of a data processing apparatus and includes a shared virtual memory device and a guest software application coupled to the shared virtual memory device. The system also includes a trusted process in the secure execution domain, separate from the virtual machine and coupled to the shared virtual memory device. The trusted process is configured to communicate with the guest software application through the shared virtual memory device. Communication with the guest software application includes secure communication.

18 Claims, 4 Drawing Sheets

(56) References Cited

U.S. PATENT DOCUMENTS

| | | |
|---|---|---|
| 7,804,862 B1 | 9/2010 | Olson et al. |
| 7,836,285 B2 | 11/2010 | Giri et al. |
| 8,146,147 B2 | 3/2012 | Litvin et al. |
| 2002/0091902 A1 | 7/2002 | Hirofuji |
| 2004/0139368 A1 | 7/2004 | Austen et al. |
| 2005/0166011 A1 | 7/2005 | Burnett et al. |
| 2006/0161753 A1 | 7/2006 | Aschoff et al. |
| 2007/0074192 A1* | 3/2007 | Geisinger ............ G06F 9/45537 717/148 |
| 2007/0112956 A1 | 5/2007 | Chapman et al. |
| 2007/0118694 A1 | 5/2007 | Watanabe et al. |
| 2007/0199058 A1 | 8/2007 | Baumgart et al. |
| 2007/0271604 A1 | 11/2007 | Webster et al. |
| 2007/0280243 A1 | 12/2007 | Wray et al. |
| 2008/0086515 A1 | 4/2008 | Bai et al. |
| 2008/0168479 A1* | 7/2008 | Purtell ................. G06F 9/45558 719/328 |
| 2008/0205415 A1 | 8/2008 | Morales |
| 2008/0215796 A1 | 9/2008 | Lam et al. |
| 2008/0244471 A1 | 10/2008 | Killian et al. |
| 2008/0270704 A1 | 10/2008 | He et al. |
| 2009/0097657 A1 | 4/2009 | Scheidt et al. |
| 2009/0150629 A1 | 6/2009 | Noguchi et al. |
| 2009/0199177 A1 | 8/2009 | Edwards et al. |
| 2009/0222815 A1 | 9/2009 | Dake |
| 2009/0241108 A1 | 9/2009 | Edwards et al. |
| 2009/0249440 A1 | 10/2009 | Platt et al. |
| 2009/0276771 A1 | 11/2009 | Nickolov et al. |
| 2009/0300605 A1 | 12/2009 | Edwards et al. |
| 2010/0057913 A1 | 3/2010 | DeHaan |
| 2010/0071035 A1 | 3/2010 | Budko et al. |
| 2010/0095000 A1 | 4/2010 | Kettler et al. |
| 2010/0199089 A1 | 8/2010 | Vysogorets et al. |
| 2010/0287548 A1 | 11/2010 | Zhou et al. |
| 2011/0022812 A1 | 1/2011 | van der Linden et al. |
| 2011/0055361 A1 | 3/2011 | DeHaan |
| 2011/0088031 A1* | 4/2011 | Takahashi ......................... 718/1 |
| 2011/0145821 A1* | 6/2011 | Philipson et al. ................. 718/1 |
| 2011/0153838 A1 | 6/2011 | Belkine et al. |
| 2011/0191485 A1 | 8/2011 | Umbehocker |
| 2011/0231280 A1 | 9/2011 | Farah |
| 2011/0258441 A1 | 10/2011 | Ashok et al. |
| 2012/0185688 A1 | 7/2012 | Thornton |

OTHER PUBLICATIONS

Zhang et al. ("XenSocket: A high-throughput interdomain Transport for virtual machines", 2007, IBM T.J Watson research center, p. 184-203).*
Moller, Jan, et al., "Internal Network Security", Feb. 1, 2000-May 18, 2001, Retrieved from the Internet: daimi.au.dk/~fwiffo/thesis/>, 183 pages.
Primet, Pascale, et al.., "HIPCAL: State of the Art of OS and Network virtualization solutions for Grids", Sep. 14, 2007, 38 pages.
Wikipedia, "IPSec", [online] [retrieved on Jan. 4, 2011]. Retrieved from the Internet: en.wikipedia.org/wiki/IPsec/>, 8 pages.
Abdull, AlastairIrvine, et al. "Generic Routing Encapsulation", [online] [retrieved on Jan. 4, 2011]. Retrieved from the Internet: creativecommons. org/ licenses/ by-sa/ 3. 0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 13 pages.
Bucket Explorer. "What is my AWS Access and Secret Key." [Retrieved Apr. 26, 2011]. Retrieved from the Internet .bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet .hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet /onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: en.wikipedia.org/wiki/OAuth>, 3 pages.
Gowalla. "API Documentation—Oauth." [Retrieved on Apr. 26, 2011]. Retrieved from the Internet /gowalla.com/api/docs/oauth>, 4 pages.
Apache HTTP Server Version 2.0. "Log Files." [Retrieved on Feb. 15, 2011]. Retrieved from the Internet httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: en.wikipedia.org/wiki/Networkpages_Address_and_Port_Translation>, 11 pages.
Wikipedia., Anycast [Retrieved on Oct. 10, 2011] Retrieved from the Internet: en.wikipedia.org/wiki/Anycast>, 5 pages.
VMCI Overview [Retrieved on Jun. 8, 2011] Retrieved from the Internet: pubs.vmware.com/vmci-sdk/VMCI_intro.html>, 3 pages.
VMware vSphere [Retrieved on Jun. 8, 2011] Retrieved from the Internet: <URL: .vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios—Install Nagios to effectively monitor a data center; make Ganglia and Nagios work together," 2009, 20 pages.

(56) References Cited

OTHER PUBLICATIONS

'Nagios' [online]. "Monitoring Linux/Unix Machines," 2011, [retrieved on Feb. 3, 2011]. Retrieved from the Internet: nagios.sourceforge.net/docs/3_0/monitoring-linux.html > 1 page.

'Nagios' [online]. "Nagios Plugins," 2011, [retrieved on Feb. 3, 2011]. Retrieved from the Internet: agios.sourceforge.net/docs/3_0/plugins.html > 2 pages.

'Zabbix' [online]. "Zabbix 1.8: The Ultimate Open Source Monitoring Solution," 2001-2012, [retrieved on Feb. 3, 2011]. Retrieved from the Internet: .zabbix.com/features.php.> 1 page.

Amazon Elastic Compute Cloud, User Guide, API Version Mar. 1, 2012, pp. 97-103, downloaded from ocs.amazonwebservices.com/AWSEC2/latest/UserGuide/AESDG-chapter-instancedata.html?r=4276 on Mar. 18, 2012.

Paravirtualization, Wikipedia Article, downloaded from en.wikipedia.org/wiki/Paravirtualization on Mar. 18, 2012.

Paravirtualized File Systems, Eric Van Hensbergen, downloaded from slideshare.net/ericvh/9p-on-kvm on Mar. 18, 2012.

"IPsec". Creativecommons.org [online]. Creative Commons Attribution-Share Alike 3.0 Unported. [retrieved on Jan. 14, 2011]. Retrieved from the Internet: creativecommons.org/licenses/by-sa/3.0 >, pp. 1-8.

"Generic Routing Encapsulation". Creativecommons.org [online]. Creative Commons Attribution-Share Alike 3.0 Unported. [retrieved on Jan. 14, 2011]. Retrieved from the Internet: creativecommons.org/licenses/by-sa/3.0/ >, pp. 1-5.

Cloud Computing Course, Part 2: Amazon's EC2, Marcel Gagne, Jun. 13, 2011. Retrieved from the Internet: marcelgagne.com/content/cloud-computing-course-part-2-amazons-ec2>, 6 pages.

How to: Getting Started With Amazon EC2, Paul Stamatiou, Apr. 5, 2008. Retrieved from the Internet: <paulstamatiou.com/how-to-getting-started-with-amazon-ec2>, 25 pages.

Uploading Personal ssh Keys to Amazon EC2, Eric Hammond, Oct. 14, 2010. Retrieved from the Internet: /alestic.com/2010/10/ec2-ssh-keys>, 3 pages.

Key Management in Cloud Datacenters, Security Stackexchange.com, Retrieved from the Internet on Nov. 18, 2011; Retrieved from: <security.stackexchange.com/questions/2514/key-management-in-cloud-datacenters>, 2 pages.

Managing Amazon EC2-SSH Login and Protecting Your Instances, Everyday's Findings, Monday, May 18, 2009, Retrieved from the Internet on Nov. 18, 2011; Retrieved from: blog.taggesell.de/index.php?/aarchives/73-Managing-Amazon-EC2., 6 pages.

Using and Managing AWS—Part 6: SSH Key Pairs, Top WordPress, May 26, 2009, Retrieved from the Internet:louddb.info/2009/05/26/using-and-managing-aws-part-6-ssh-key-pairs>, 5 pages.

L. Gommans, et al., Token-Based Authorization of Connection Oriented Network Resources, 1st International Workshop on Networks for Grid Applications (GridNets 2004), Oct. 29, 2004; 8 pages.

Hyun, Ahn Ji, Authorized Officer for Korean Intellectual Property Office, International Search Report and Written Opinion for PCT/US2012/021846, International Search Report completed May 25, 2012, 8 pages.

Na, Lee Da, Authorized Officer for Korean Intellectual Property Office, International Search Report and Written Opinion for PCT/US2012/020954, International Search Report completed Aug. 23, 2012, 10 pages.

Alpern, B., "The Jalapeno virtual machine," IBM Systems Journal, 2000, vol. 39, Issue 1, pp. 211-238.

Bok, Jin Yo, Authorized Officer for Korean Intellectual Property Office, International Search Report and Written Opinion for PCT/US2012/029210, International Search Report completed Oct. 10, 2012, 2 pages.

Anonymous, "Storage I/O Control Technical Overview and Consideration for Deployment," VMware vSphere™ 4.1, Jan. 1, 2010, XP05504491, retrieved from the internet: URL: http://www.vmware.com/fled/pdf/techpaper/WMW-vSphere41-SIOC.pdf; [retrieved on Nov. 21, 2012], 12 pages.

* cited by examiner

SECURE INTER-PROCESS COMMUNICATION

BACKGROUND

This document relates to inter-process communication, and more specifically to inter-process communications between a trusted process and an untrusted process using a virtual memory device.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Some cloud computing services allow end users to execute software applications in virtual machines.

SUMMARY

This document describes systems that provide secure communications between a virtual machine and a process external to the virtual machine.

In one aspect, a system includes a secure execution domain configured to execute trusted processes. The system also includes a hardware virtualization component in the secure execution domain and configured to implement a virtual machine. The virtual machine is a hardware virtualization of a data processing apparatus and includes a shared virtual memory device and a guest software application coupled to the shared virtual memory device. The system also includes a trusted process in the secure execution domain, separate from the virtual machine and coupled to the shared virtual memory device. The trusted process is configured to communicate with the guest software application through the shared virtual memory device. Communication with the guest software application includes secure communication.

These and other aspects can optionally include one or more of the following features. The guest software application is isolated from resources associated with the secure execution domain and data stored in a database associated with the trusted process. The trusted process is configured to provide data from the database to the guest software application using the shared virtual memory device. The hardware virtualization component is further configured to implement a communication channel coupled to the virtual machine and to the trusted process, wherein the communication channel includes a signal. The hardware virtualization component is further configured to implement a memory driver associated with the shared virtual memory device. The shared virtual memory device comprises a semaphore configured to control access to the shared virtual memory device. The shared virtual memory device comprises a virtualization of a PCI device including memory.

In another aspect, a method includes executing an operating system on a data processing apparatus that implements a secure execution domain that is configured to execute trusted processes. The trusted processes include a hardware virtualization component to implement a virtual machine. The method includes executing the virtual machine in the secure execution domain. The virtual machine is a hardware virtualization of a data processing apparatus and includes a shared virtual memory device and a guest software application coupled to the shared virtual memory device. The method includes exchanging data between the guest software application and a particular trusted process using the shared virtual memory device, wherein the particular trusted process is separate from the virtual machine.

These and other aspects can optionally include one or more of the following features. The method can also include writing data to the shared virtual memory device, wherein the data is from the particular trusted process; providing a signal to the guest software application to indicate that data has been written into the shared virtual memory device; and in response to the signal, reading the data from the shared virtual memory device, wherein the data is read from the shared virtual memory device by the guest software application. The signal includes a flag or interrupt signal. The guest software application is isolated from resources associated with the secure execution domain and data stored in a database associated with the trusted processes. The method also includes checking out a semaphore before writing data, wherein the semaphore is configured to control access to the shared virtual memory device.

Particular aspects of the subject matter described can be implemented to realize one or more of the following advantages. For example, software applications, such as user applications hosted on a virtual machine that has been isolated from particular resources and/or data, can exchange data and/or otherwise interact with processes external to the virtual machine using shared virtual memory. In addition, security created by isolating the virtual machine can be preserved because software application cannot access memory or resources external to the virtual machine.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Systems and methods are described for secure communications between a virtual machine and a trusted process. A computing device, such as a server or a computer, can execute a first and second trusted process. The first trusted process can be executed in a secure execution domain, such as an operating system running on the computing device, and can include a hardware virtualization component that can be used to implement virtual machines that include virtual devices (e.g., virtual memory, virtual networking interfaces and modules, etc.). A virtual machine can execute an operating system that can host a guest application. Although the guest application can be sandboxed by the virtual machine, the guest application can exchange data and/or communicate with the second trusted process using a virtual memory device. The communications between the second trusted process and the guest application can be secure because the guest application does not have access to memory and/or resources external to the virtual machine.

Figure 1:
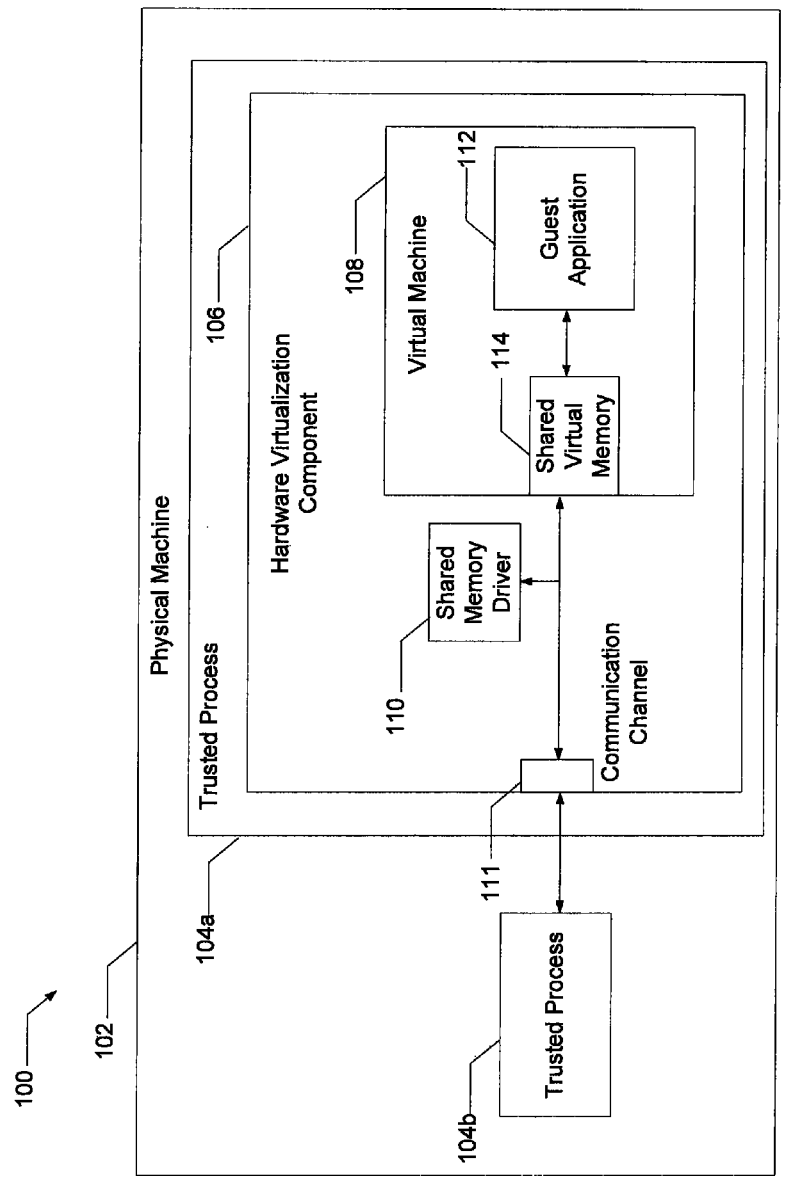
FIG. 1 is a block diagram of an example system that provides secure communication between a virtual machine and a trusted process.

FIG. 1 is a block diagram of an example system 100 that provides secure communication between a virtual machine and a trusted process. The system 100 includes a physical machine 102 that is configured to implement trusted processes 104a and 104b. The physical machine 102 can be any type of data processing apparatus, such as a personal computer, a workstation, a server, etc. The physical machine 102 can be part of a collection of servers housed in a data center and can be configured to communicate with other servers and/or computing devices in the data center. The physical machine 102 can also be part of an internal network (e.g., an intranet). For example, the physical machine 102 can be connected to a company's internal network and communicate with other machines connected to the company's internal network. The physical machine 102 can also communicate with machines that are not part of a company's internal network using the Internet. For example, the physical machine 102 can communicate with a user's computing device using the Internet. In some implementations, the physical machine 102 can be part of a cloud computing system and host one or more virtual machines 108 that host guest applications 112.

The trusted processes 104a and 104b can be software processes or applications that are initiated by an operator or administrator of the physical machine 102 and are executed by the physical machine 102 in a secure execution domain. The phrase "secure execution domain" as used herein encompasses its plain and ordinary meaning, including, but not limited to an operating system running on the physical machine 102 controlled or operated by an administrator or entity associated with the physical machine 102 (e.g., the owner or provider of the physical machine 102. As discussed below, the trusted processes 104a and 104b may execute on two or more processors or systems (not pictured). The trusted process 104b can be an application that can access resources and data that are not accessible by other processes. For example, the trusted process 104b can be a process (e.g., a Map Reduce Process or video processing/compressing algorithm) that can access databases or other resources and provide the data stored in the databases to other applications or processes (e.g., a guest application 112). The map-reduce technique applies at least one application-specific map operation to the input data to produce intermediate data values, wherein the map operation is parallelized across multiple processors in the parallel processing or distributed environment. A plurality of intermediate data structures may be used to store the intermediate data values. One or more application-independent reduce modules are configured to retrieve the intermediate data values and to apply at least one application-specific reduce operation to the intermediate data values to provide output data. In some implementations, the trusted process 104a can implement a reduce module and a user software application (e.g., the guest application 112) can implement a map module. An example Map Reduce Process is described in U.S. Pat. No. 7,650,331, which is incorporated by reference for all purposes.

In some implementations, the trusted process 104b is running on a physical machine that is different from the physical machine 102 that is executing the trusted process 104a but is connected to the physical machine 102 via an internal network or Internet. In general, a process is a trusted process if it is initiated by an operator or administrator associated with the physical machine 102 and executed on the physical machine 102 as opposed to being executed on a virtual machine 108.

The trusted process 104a can include a hardware virtualization component 106. The hardware virtualization component 106 can be used to implement virtual devices. For example, in some implementations, the hardware virtualization component 106 can include a virtualization component, e.g., a Kernel-based Virtualization Machine, and a processor emulator, e.g., QEMU, to virtualize and emulate hardware devices, such as a virtual machine 108, a shared memory driver 110 and a communication channel 111. Although FIG. 1 illustrates a single virtual machine 108, a shared memory driver 110 and a single communication channel 111, in some implementations, multiple virtual machines, various types of drivers and multiple communication channels can be implemented on the same physical machine. In addition, other virtual hardware devices (e.g., a network access interface) can be virtualized.

The virtual machine 108 can be a hardware virtualization of a data processing apparatus (e.g., a computer or server). For example, the virtual machine 108 can be a virtualized computer that includes an operating system (e.g., a guest operating system), a guest application 112 and a shared virtual memory device 114. The virtual machine 108 can be associated with an end user. For example, virtual machine 108 can be assigned to or be associated with an end user of the system 100 (e.g., a user that rents or purchases computing resources from the operator of a cloud computing system). The end user can host various data and/or software applications on the virtual machine 108. In addition, the end user can execute applications (e.g., guest application 112) on the virtual machine 108.

The virtual machine 108 can be isolated or partially isolated from the physical machine 102 and/or the trusted processes 104a and 104b. The term "isolated" as used herein encompasses its plain and ordinary meaning, including but not limited to the virtual machine 108 having limited access to the hardware and/or software resources not included in the virtual machine 108 or the hardware virtualization component 108. For example, the virtual machine 108 can be sandboxed (e.g., executed in a controlled environment with a limited set of resources) and have limited access to hardware resources associated with the physical machine (e.g., network interface components, cache, memory, etc.) and can have limited access to software resources associated with the physical machine and/or trusted processes 104a and 104b (e.g., databases, operating systems, etc.).

The guest application 112 can be a software application executed on the virtual machine 108 by the end user. In some implementations, the guest application 112 can expect input or data from a trusted source (e.g., the trusted process 104b). For example, the trusted process 104b can retrieve data from a database, a network or a data center service (e.g., proprietary business data, advertising data, etc.) and provide that data to the guest application 112. In addition, the guest application 112 can provide data to the trusted process 104b. In some implementations, the guest application 112 can provide data to end users associated with the virtual machine 108. For example, the guest application 112 can process or calculate data received from the trusted process 104b and provide the processed data to the end user.

The guest application 112 is sometimes referred to as an untrusted process because the guest application 112 might be malicious software meant to interfere with the physical machine 102, the trusted processes 104a and 104b, and/or data associated with the physical machine 102 or the trusted processes 104a and 104b (e.g., proprietary business data, user records or accounts, etc.). Because the virtual machine 108 is isolated from the physical machine 102 and the trusted processes 104a and 104b, the guest application 112 is also isolated from the physical machine 102 and the trusted processes 104a and 104b (e.g., sandboxed by the virtual machine 108). This isolation or sandboxing can limit the guest application's ability to interfere with the physical machine 102 or trusted processes 104a and 104b can contain any malicious software within the virtual machine 108. However, the guest application 112 can access the virtual machine's virtualized resources and virtualized components. For example, the guest application 112 can interact with the guest OS and/or virtual hardware devices (e.g., the shared virtual memory device 114).

The shared virtual memory 114 can be a virtual or emulated memory device. For example, the shared virtual memory 114 can be a virtual Peripheral Component Interconnect (PCI)-device that includes memory, e.g., a virtual PCI video card that includes a frame buffer. In some implementations, the shared virtual memory 114 can be other types of shared virtual memory. For example, in some implementations, the shared virtual memory 114 can be a dual ported memory device (e.g., a dual ported RAM). The shared virtual memory 114 can be implemented as a virtual device by the shared memory driver 110. The shared memory driver 110 is not included in the virtual machine 108 and is included in the hardware virtualization component 106.

The shared virtual memory 114 can be memory mapped or accessible to software (e.g., coupled) such that the shared virtual memory 114 can be accessed by the guest OS, the guest application 112, the shared memory driver 110, the communication channel 111, the trusted process 104b and/or other applications running on the virtual machine 108. For example, the shared virtual memory 114 can be associated with Application Programming Interfaces ("APIs") that can be used by the trusted process 104b and/or the guest application 112 to access the shared virtual memory 114. In some implementations, the shared virtual memory 114 is associated with a first API to be used by the trusted process 104b to access the shared virtual memory 114 (e.g., read data from the shared virtual memory 114 and/or write data to the shared virtual memory 114) and a second API that is used by the guest application 112 to access the shared virtual memory 114.

The shared virtual memory 114 can include a device driver that allows the guest application 112 and other applications and/or devices included in the virtual machine 108 to communicate with the shared virtual memory 114.

In some implementations, the shared virtual memory 114 can include a semaphore that can be used to control access to the shared virtual memory 114. The guest application 112 and the trusted process 104b can interact with the semaphore using an API associated with the shared virtual memory 114. For example, the guest application 112 can use an API to check out the semaphore before the guest application 112 writes data to the shared virtual memory 114. While the semaphore is checked out to the guest application 112, other applications and/or processes should not access the shared virtual memory 114 until the guest application 112 releases the semaphore. After the guest application 112 has written data to the shared virtual memory 114, the guest application 112 can release the semaphore using an API. In some implementations, the shared virtual memory 114 manages the semaphore automatically in response to the APIs. For example, after receiving a read instruction or a write instruction, the shared virtual memory 114 can check out and release the semaphore as appropriate. In some implementations, the shared virtual memory 114 can include multiple semaphores, each associated with different portions of shared virtual memory 114. In such implementations, the requesting process can request (or receive) a semaphore for only the portion of the memory to which it would like to write. This can allow processes to write simultaneously to multiple portions of the shared virtual memory 114 if there is no conflict in the writes.

After the guest application 112 writes data into the shared virtual memory 114, a flag (e.g., a doorbell register) included in the communication channel 111 can be set to indicate that data has been written into the shared virtual memory 114. For example, after data is written into the shared virtual memory 114, the guest application 112 can use an API associated with the communication channel 111 to set the flag or trigger an interrupt to alert the trusted process 104b that data has been written to the shared virtual memory 114. In some implementations, the trusted process 104b periodically or continuously polls the doorbell register to determine if data has been written to the shared virtual memory 114. The communication channel 111 can be a communication channel to facilitate inter-process communications (e.g., communications between the trusted processes 104a and 104b). For example, the communication channel 111 can be a Unix domain socket or a named pipe between the virtual machine and the trusted process 104b. In some implementations, the communication channel 111 can be associated with APIs that allow the trusted process 104b and/or the guest application 112 to exchange data without the use of a shared virtual memory 114. For example, the communication channel 111 can be a network connection that allows the guest application 112 to exchange data with the trusted process 104b.

Figure 2A:
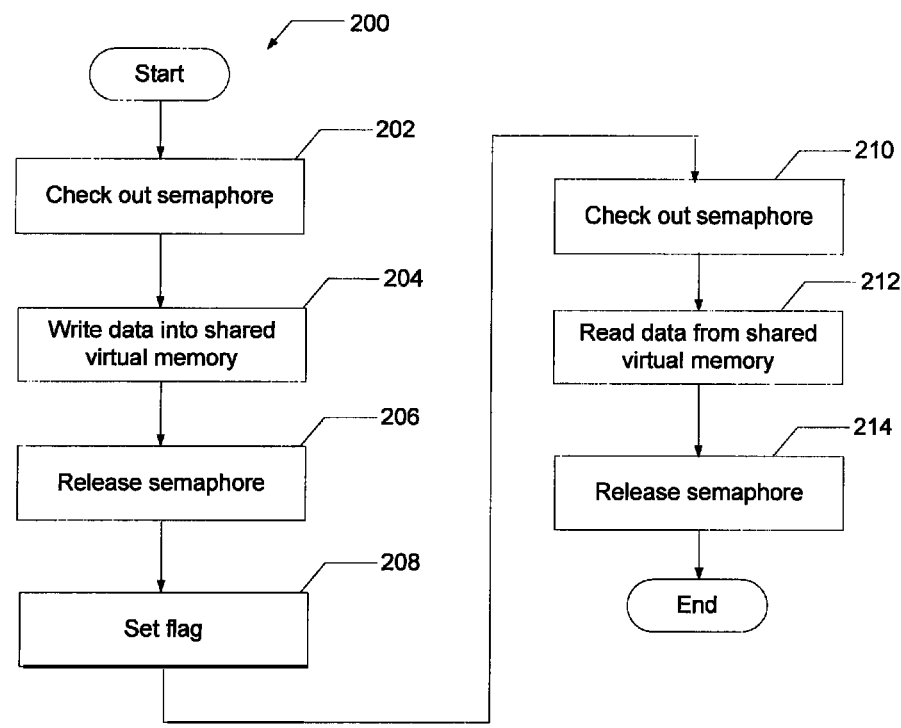
FIG. 2A is a flowchart of an example process for exchanging communications between a virtual machine and a trusted process.

FIG. 2A is a flowchart of an example process 200 to exchange communications between a virtual machine and a trusted process. The process 200 begins when the semaphore is checked out (at 202). For example, the guest application 112 running on the virtual machine 108 can check out the semaphore using an API associated with the shared virtual memory 114.

Data is then written into the shared virtual memory (at 204). For example, the guest application 112 can write data into the shared virtual memory 114 using an API associated with the shared virtual memory 114. In some implementations, the shared virtual memory 114 is memory mapped such that the guest application 112 can write data into the shared virtual memory 114. After the data is written into the shared virtual memory, the semaphore can be released (at 206). For example, the guest application 112 can release the semaphore using an API associated with the shared virtual memory 114.

After the semaphore is released, a flag can be set (at 208). For example, the guest application 112 can set a flag (e.g., a doorbell register) to alert the trusted process 104b of the data in the shared virtual memory 114. In some implementations, the guest application 112 can use an API associated with the communication channel 111 to set a flag (e.g., a doorbell register) to alert the trusted process 104b that data has been written into the shared virtual memory 114.

In response to the flag, the trusted process can check out the semaphore (at 210). For example, the trusted process 104b can use an API associated with the shared virtual memory 114 to check out the semaphore. The trusted process can then read data from the shared virtual memory (at 212). For example, the trusted process 104*b* can use an API associated with the shared virtual memory 114 to read data from the shared virtual memory 114.

After the data has been provided to the trusted process, the semaphore can be released (at 216). For example, the trusted process 104*b* can use an API associated with the shared virtual memory 114 to release the semaphore.

Figure 2B:
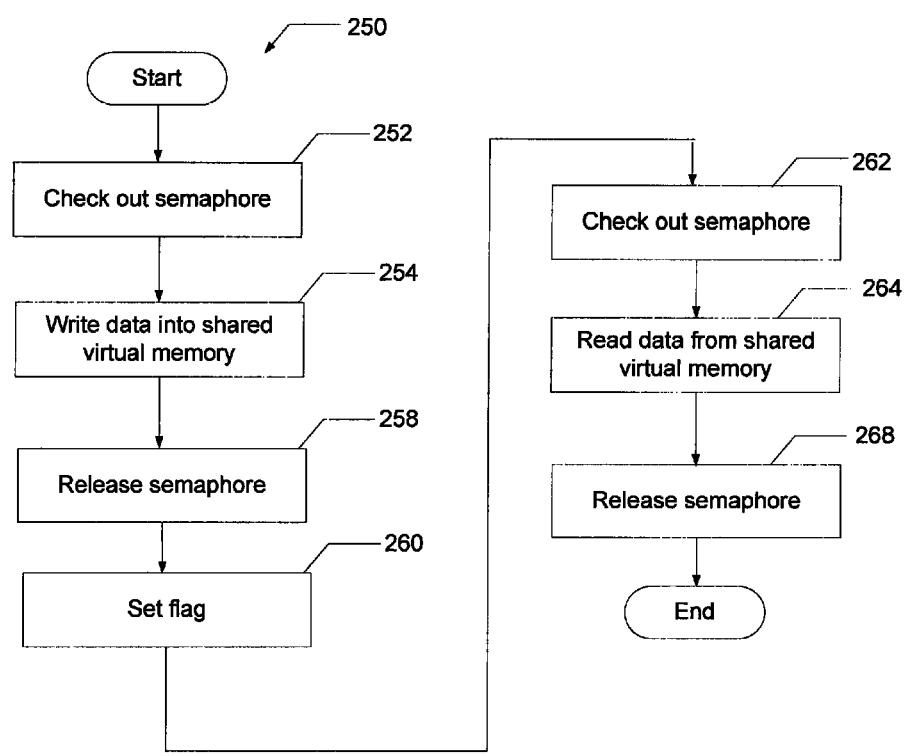
FIG. 2B is a flowchart of an example process for exchanging communications between a virtual machine and a trusted process.

FIG. 2B is a flowchart of an example process 250 to exchange communications between a virtual machine and a trusted process. The process 250 begins when the trusted process checks out the semaphore (at 252). For example, the trusted process 104*b* can use an API associated with the virtual memory 114 to check out the semaphore. After the semaphore is checked out, the trusted process can send a write data to the shared virtual memory address (at 254). For example, the trusted process 104*b* can use an API associated with the shared virtual memory 114 to write data into the shared virtual memory 114. The trusted process 104*b* can send the data or a pointer to the data to the shared virtual memory 114 as part of the write instruction.

The trusted process can then release the semaphore (at 258). For example, the trusted process 104*b* can use an API associated with the shared virtual memory 114 to release the semaphore. The shared virtual memory can then set a flag to alert the guest application that data has been written into the shared virtual memory 114 (at 260). For example, the trusted process 104*b* can use an API associated with the communication channel 111 to insert an interrupt for the shared virtual memory 114 to alert the guest application 112 that data has been written into the virtual memory 114.

After the guest application detects the flag, the guest application can check out the semaphore (at 262). For example, after the guest application 112 detects that the doorbell register indicates that data has been written into the shared virtual memory 114 the guest application 112 can use an API associated with the shared virtual memory 114 to check out the semaphore. The guest application then reads data from the shared virtual memory (at 264). For example, the guest application 112 can use an API associated with the shared virtual memory 114 to read data from a particular memory address associated with data received from the trusted process 104*b*. After the data has been read, the guest application 112 can release the semaphore. For example, the guest application can use an API associated with the shared virtual memory 114 to release the semaphore.

Figure 3:
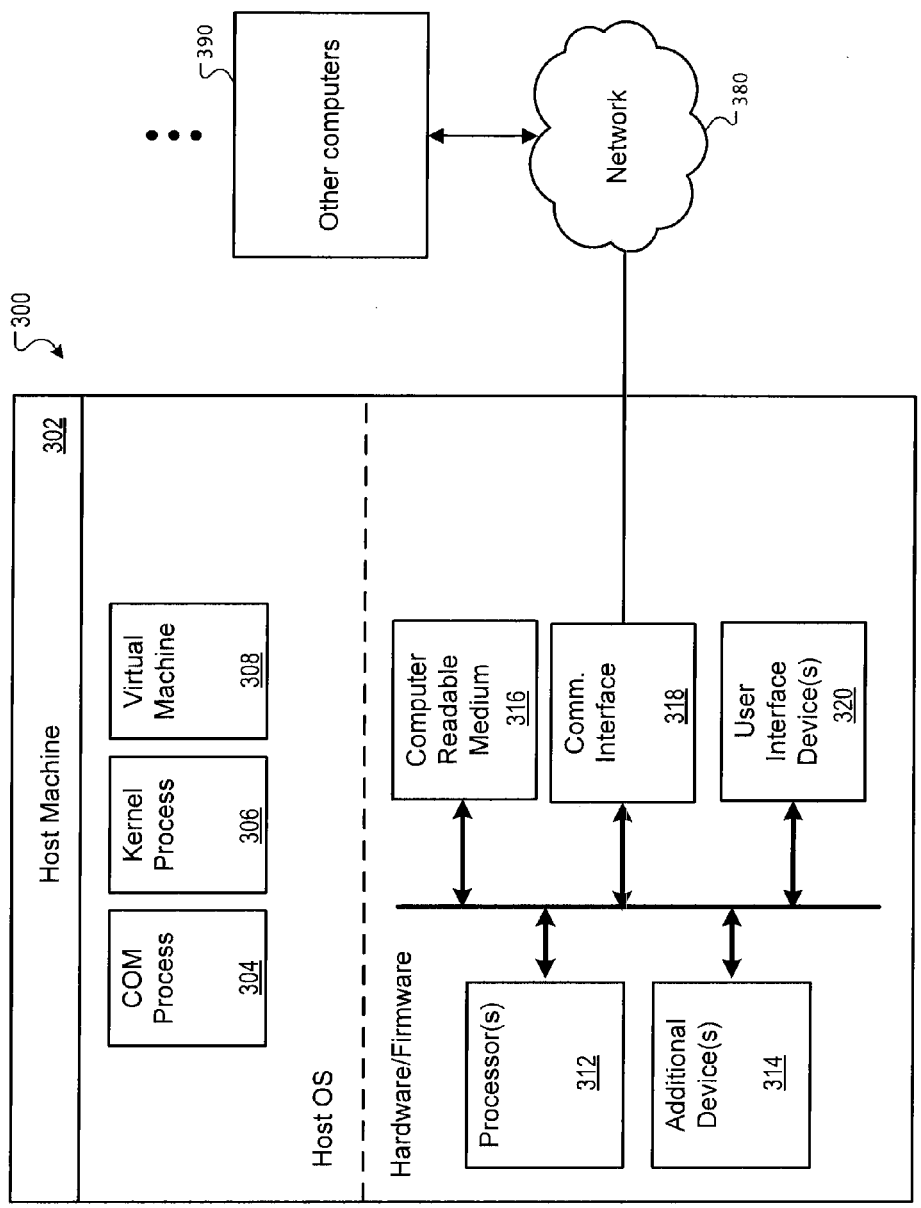
FIG. 3 is a block diagram of an example host machine.

FIG. 3 is a schematic diagram of an example physical machine. The physical machine 300 generally consists of a data processing apparatus 302. The data processing apparatus 302 can optionally communicate with one or more other computers 390 through a network 380. While only one data processing apparatus 302 is shown in FIG. 3, multiple data processing apparatus can be used in one or more locations. The data processing apparatus 302 includes various modules, e.g. executable software programs. One of the modules is the kernel 306 of a host operating system (e.g., trusted process 104*a*). A communication process module 304 is configured to establish VPNs, encapsulate packets and to de-encapsulate packets. A hardware virtualization component (e.g., hardware virtualization component 106) includes virtual hardware (e.g., virtual machine 106) that includes a guest operating system (e.g., guest OS), and guest applications (e.g., guest application 112). Although several software modules are illustrated, there may be fewer or more software modules. Moreover, the software modules can be distributed on one or more data processing apparatus connected by one or more networks or other suitable communication mediums.

The data processing apparatus 302 also includes hardware or firmware devices including one or more processors 312, one or more additional devices 314, a computer readable medium 316, a communication interface 318, and optionally one or more user interface devices 320. Each processor 312 is capable of processing instructions for execution within the data processing apparatus 302. In some implementations, the processor 312 is a single or multi-threaded processor. Each processor 312 is capable of processing instructions stored on the computer readable medium 316 or on a storage device such as one of the additional devices 314. The data processing apparatus 302 uses its communication interface 318 to communicate with one or more computers 390, for example, over a network 380. Examples of user interface devices 320 include a display, a camera, a speaker, a microphone, a tactile feedback device, a keyboard, and a mouse. The data processing apparatus 302 can store instructions that implement operations associated with the modules described above, for example, on the computer readable medium 316 or one or more additional devices 314, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system having one or more physical machines, comprising:
   a secure execution domain established on a host operating system executing a first trusted process;
   a hardware virtualization component operating within the secure execution domain and configured to implement a virtual machine, wherein the virtual machine is a hardware virtualization of a data processing apparatus, and wherein the virtual machine is isolated such that the virtual machine has limited access to resources not included in the virtual machine and the hardware virtualization component, and comprises:
      a shared virtual memory device within the virtual machine; and
      a guest software application, executed within the virtual machine and communicatively coupled to the shared virtual memory device, the virtual machine being configured such that the guest software application executed in the virtual machine does not have access to memory and resources that are external to the virtual machine and the guest software application can communicate with a second trusted process executed within the secure execution domain but external to the virtual machine using only the shared virtual memory device;
   the second trusted process running in the secure execution domain on the host operating system, the second trusted process being separate from the virtual machine and enabled to access at least some of the resources of the secure execution domain, wherein the second trusted process is communicatively coupled to the shared virtual memory device and configured to communicate with the guest software application only through the shared virtual memory device via a communication channel using a memory driver associated with the snared virtual memory device,
   wherein communications between the second trusted process and the guest software application are secure communications based on the guest software application being configured such that the guest software application does not have access to memory and resources that are external to the virtual machine and can communicate with the second trusted process using only the shared virtual memory device.

2. The system of claim 1 wherein the second trusted process is configured to provide data from a database to the guest software application using the shared virtual memory device.

3. The system of claim 1 wherein the secure communication between the second trusted process and guest software application comprises a Unix domain socket.

4. The system of claim 1 wherein the shared virtual memory device comprises a semaphore configured to control access to the shared virtual memory device.

5. The system of claim 1 wherein the guest software application comprises an untrusted software application.

6. The system of claim 5 wherein the untrusted software application comprises a software application associated with a third party user that is associated with the virtual machine.

7. The system of claim 1 wherein the second trusted process comprises a software application associated with an operator of the secure execution domain.

8. The system of claim 1 wherein the shared virtual memory device comprises a virtualization of a Peripheral Component Interconnect device including memory.

9. The system of claim 1 wherein a communication between the second trusted process and the guest software application comprises:
   data written into the shared virtual memory device; and
   the signal provided to the guest software application to indicate that data has been written into the shared virtual memory device, wherein the signal is provided to the guest software application using the communication channel.

10. A computer-implemented method comprising:
    executing, by one or more physical machines, a secure execution domain established on a host operating system executing a first trusted process;
    executing a hardware virtualization component operating within the secure execution domain and the hardware virtualization component implementing a virtual machine, wherein the virtual machine is a hardware virtualization of a data processing apparatus, and wherein the virtual machine is isolated such that the virtual machine has limited access to resources not included in the virtual machine and the hardware virtualization component, and comprises:
       a shared virtual memory device within the virtual machine; and
       a guest software application, executed within the virtual machine and communicatively coupled to the shared virtual memory device, the virtual machine being configured such that the guest software application executed in the virtual machine does not have access to memory and resources that are external to the virtual machine and the guest software application can communicate with a second trusted process executed within the secure execution domain but external to the virtual machine using only the shared virtual memory device;
    executing the second trusted process, the second trusted process running in the secure execution domain on the host operating system, the second trusted process being separate from the virtual machine and enabled to access at least some of the resources of the secure execution domain, wherein the second trusted process is communicatively coupled to the shared virtual memory device and configured to communicate with the guest software application only through the shared virtual memory device via a communication channel using a memory driver associated with the shared virtual memory device; and
       exchanging data between the guest software application and the second trusted process, wherein communications between the second trusted process and the guest software application are secure communications based on the guest software application being configured such that the guest software application does not have access to memory and resources that are external to the virtual machine and can communicate with the second trusted process using only the shared virtual memory device.

11. The computer-implemented method of claim 10, wherein exchanging data comprises:
    writing data to the shared virtual memory device, wherein the data is from the second trusted process;

providing a signal to the guest software application to indicate that data has been written into the shared virtual memory device; and in response to the signal, reading the data from the shared virtual memory device, wherein the data is read from the shared virtual memory device by the guest software application.

12. The computer-implemented method of claim 11, wherein the signal comprises a flag or an interrupt signal.

13. The computer-implemented method of claim 11, further comprising:

checking out a semaphore before writing data, wherein the semaphore is configured to control access to the shared virtual memory device.

14. The computer-implemented method of claim 10, wherein the shared virtual memory device comprises a virtualization of a Peripheral Component Interconnect device including memory or a dual ported memory device.

15. A non-transitory computer readable medium encoded with a computer program comprising instructions that, when executed, operate to cause a computer to perform operations of:

execute, on the computer, a secure execution domain established on a host operating system executing a first trusted process;

execute a hardware virtualization component operating within the secure execution domain and the hardware virtualization component implementing a virtual machine, wherein the virtual machine is a hardware virtualization of a data processing apparatus, and wherein the virtual machine is isolated such that the virtual machine has limited access to resources not included in the virtual machine and the hardware virtualization component, and comprises:

a shared virtual memory device within the virtual machine; and a guest software application, executed within the virtual machine and communicatively coupled to the shared virtual memory device, the virtual machine being configured such that the guest software application executed in the virtual machine does not have access to memory and resources that are external to the virtual machine and the guest software application can communicate with a second trusted process executed within the secure execution domain but external to the virtual machine using only the shared virtual memory device;

execute the second trusted process, the second trusted process running in the secure execution domain on the host operating system, the second trusted process being separate from the virtual machine and enabled to access at least some of the resources of the secure execution domain, wherein the second trusted process is communicatively coupled to the shared virtual memory device and configured to communicate with the guest software application only through the shared virtual memory device via a communication channel using a memory driver associated with the shared virtual memory device; and exchange data between the guest software application and the second trusted process, wherein communications between the second trusted process and the guest software application are secure communications based on the guest software application being configured such that the guest software application does not have access to memory and resources that are external to the virtual machine and can communicate with the second trusted process using only the shared virtual memory device.

16. The computer readable medium of claim 15, further comprising instructions that, when executed, operate to cause the computer to perform operations:

writing data to the shared virtual memory device, wherein the data is from the second trusted process;

providing a signal to the guest software application to indicate that data has been written into the shared virtual memory device; and in response to the signal, reading the data from the shared virtual memory device, wherein the data is read from the shared virtual memory device by the guest software application.

17. The computer readable medium of claim 16, wherein the signal comprises a flag or an interrupt signal.

18. The computer readable medium of claim 16 further comprising instructions that, when executed, operate to cause the computer to perform operations:

checking out a semaphore before writing data, wherein the semaphore is configured to control access to the shared virtual memory device.

* * * * *